US010816095B2

(12) United States Patent
Arzuaga et al.

(10) Patent No.: US 10,816,095 B2
(45) Date of Patent: Oct. 27, 2020

(54) DECOKING CONTROL VALVE USING DYNAMIC ROD SEAL

(71) Applicant: Flowserve Management Company, Irving, TX (US)

(72) Inventors: Daniel Arzuaga, Hermosa Beach, CA (US); Hrishikesh Gadre, Long Beach, CA (US); James T. McGuire, Fullerton, CA (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 15/579,253

(22) PCT Filed: Jun. 2, 2016

(86) PCT No.: PCT/US2016/035433
§ 371 (c)(1),
(2) Date: Dec. 4, 2017

(87) PCT Pub. No.: WO2016/196737
PCT Pub. Date: Dec. 8, 2016

(65) Prior Publication Data
US 2018/0156341 A1     Jun. 7, 2018

Related U.S. Application Data

(60) Provisional application No. 62/170,305, filed on Jun. 3, 2015.

(51) Int. Cl.
*F16K 3/34* (2006.01)
*F16K 3/316* (2006.01)
(Continued)

(52) U.S. Cl.
CPC .............. *F16K 3/34* (2013.01); *C10B 33/006* (2013.01); *F16J 15/3208* (2013.01);
(Continued)

(58) Field of Classification Search
CPC . F16K 3/243; F16K 3/246; F16K 3/34; F16K 3/26; F16K 3/316; F16K 11/0712;
(Continued)

(56) References Cited

U.S. PATENT DOCUMENTS 3,603,602 A * 9/1971 Padula ...................... F16J 15/32
277/554
3,771,562 A * 11/1973 Curran .................... F16K 3/267
137/625.38
(Continued)

FOREIGN PATENT DOCUMENTS

| CN | 2483391 Y | 3/2002 | |
|---|---|---|---|
| DE | 4110164 A1 | 10/1992 | |
| EP | 0907046 A1 * | 4/1999 | ............. F16K 3/243 |

OTHER PUBLICATIONS

DE 4110164, Oct. 1, 1992, Rexroth Mannesmann GMBH, English translation.*
(Continued)

*Primary Examiner* — Matthew W Jellett
*Assistant Examiner* — Christopher D Ballman
(74) *Attorney, Agent, or Firm* — Dinsmore & Shohl LLP (57) ABSTRACT

The decoking control valve includes a piston, a cylinder, and a hydraulic rod seal at the outlet ports. The piston can move translational inside the cylinder along a fixed direction. The cylinder houses the hydraulic rod seal in a groove of the cylinder that places the hydraulic rod seal next to the piston. The hydraulic rod seal has a seal ring in contact with the piston, and the seal rings are activated. As the piston translates within the cylinder, the seal ring will activate at one outlet port and allow fluid to flow out of another outlet port.

15 Claims, 10 Drawing Sheets

(51) Int. Cl.
*C10B 33/00* (2006.01)
*F16K 47/08* (2006.01)
*F16K 3/24* (2006.01)
*F16K 11/07* (2006.01)
*F16J 15/3208* (2016.01)
*F16K 3/26* (2006.01)
*F16K 11/02* (2006.01)

(52) U.S. Cl.
CPC .............. *F16K 3/243* (2013.01); *F16K 3/246* (2013.01); *F16K 3/26* (2013.01); *F16K 3/316* (2013.01); *F16K 11/025* (2013.01); *F16K 11/0712* (2013.01); *F16K 11/0716* (2013.01); *F16K 47/08* (2013.01); *Y10T 137/86107* (2015.04); *Y10T 137/86799* (2015.04); *Y10T 137/86879* (2015.04); *Y10T 137/87249* (2015.04)

(58) Field of Classification Search
CPC .... F16K 11/0716; F16K 11/025; F16K 47/08; F16J 15/3208; F16J 15/56; C10B 33/006; Y10T 137/86799; Y10T 137/86879; Y10T 137/86107; Y10T 137/87249
See application file for complete search history.

(56) References Cited

U.S. PATENT DOCUMENTS

| | | | |
|---|---|---|---|
| 3,964,516 A | 6/1976 | Purton et al. | |
| 3,968,971 A * | 7/1976 | Mariaulle | F16J 15/32 277/561 |
| 4,906,109 A | 3/1990 | Balsells | |
| 5,118,075 A | 6/1992 | Portolese | |
| 5,325,891 A | 7/1994 | Mateja | |
| 5,676,172 A | 10/1997 | Mukumoto | |
| 5,769,123 A | 6/1998 | Heestand et al. | |
| 6,131,612 A * | 10/2000 | Beurskens | F16K 47/04 137/625.39 |
| 8,322,373 B2 | 12/2012 | Bey | |
| 2008/0296405 A1 | 12/2008 | Hanson et al. | |

OTHER PUBLICATIONS

International Search Report and Written Opinion dated Aug. 30, 2016 for PCT/US2016/035433 Filed Jun. 2, 2016. pp. 1-5.
Communication pursuant to Article 94(3) EPC, dated August 19, 2019, relating to co-pending EP Application No. 16804394.1.
Indian Examination Report dated Feb. 19, 2020, pertaining to Indian patent application No. 201717044444.

* cited by examiner

(PRIOR ART)

FIG. 3

*(PRIOR ART)*

DECOKING CONTROL VALVE USING DYNAMIC ROD SEAL

This application claims priority to U.S. Provisional Application 62/170,305, filed Jun. 3, 2015.

BACKGROUND

This disclosure relates generally to a hydraulic decoking system for removing coke from containers such as coking drums used in oil refining, and more particularly to a control valve of the hydraulic decoking system.

In conventional petroleum refining operations, crude oil is processed into gasoline, diesel fuel, kerosene, lubricants or the like. It is a common practice to recover heavy residual hydrocarbon byproducts through a thermal cracking process known as delayed coking. In a delayed coker operation, heavy hydrocarbon (oil) is heated to a high temperature (for example, between 900° F. and 1000° F.) in large fired heaters known as a fractionation unit, and then transferred to cylindrical vessels known as coke drums which are as large as 30 feet in diameter and 140 feet in height. The heated oil releases its hydrocarbon vapors for processing into useful products, leaving behind solid petroleum coke. This coke residue must be broken up in order to remove it from the vessel and is preferably accomplished by using high pressure water directed through nozzles of a decoking (or coke cutting) tool in a process known as hydraulic decoking.

The high pressure water is supplied by a decoking jet pump. Typical flow rates and pressures during hydraulic decoking are 1000 gallons per minute (gpm) at 3000 to 4000 pounds per square inch (psi). The decoking control valve is a multipurpose valve that can route the high pressure water from the pump to either the cutting tool or recirculate it back to the tank. The cutting tool has drilling and cutting nozzles, and is lowered into the coke drum through an opening in the top of the drum. The high pressure water can be routed through either the drilling or cutting nozzles, depending on the mode of operation. Switching the flow from one set of nozzles to another is achieved through a depressurization and pressurization sequence where the supply of high pressure water to the tool is stopped until the pressure inside the tool falls below a specified value, and then restoring the full high pressure water supply again. As mentioned above, the decoking control valve is used to control this flow of water from the pump to the tool.

In addition to controlling the flow to the tool, the decoking control valve is capable of performing additional functions; providing minimum bypass flow for the pump when recirculating back to the tank to prevent damage to the pump, and supplying water at low flow and low pressure to slowly fill piping to prevent "water hammer." One such multipurpose decoking control valve was first developed and described in U.S. Pat. No. 3,964,516, which is commonly owned by the assignee of the present disclosure and is incorporated herein by reference. This single multipurpose piston-type valve removed the need for using several valves in a decoking system. The valve has one inlet port, two outlet ports, and has three operating positions. Depending on the operating position, the water from the inlet port is directed to either one or both of the outlet ports. In order to isolate an outlet port from the inlet port, the valve actuator drives the piston until it bears on a conical annular seat to create a watertight seal. However, this leads to the disadvantage of the valve actuator needing to provide sufficient force to develop the watertight seal between the piston and the valve seat. This, in turn, results in seat failure due to the inherent repeated opening and closing of the valve, rendering the valve unserviceable and limits the valve's mean time between repair. The objective of the present disclosure is to increase the mean time between repair of a decoking control valve by replacing the seats with an alternate improved sealing mechanism.

SUMMARY OF THE INVENTION

According to the first aspect of the present disclosure, a decoking control valve using a hydraulic rod seal is disclosed. The decoking control valve may also comprise a piston, a cylinder, and a hydraulic rod seal at the outlet ports. The piston is capable of moving within the cylinder along a translational direction. The cylinder additionally houses the hydraulic rod seal within a groove of the cylinder that places the hydraulic rod seal next to the piston. The hydraulic rod seal features a seal ring that interacts with the piston, and the seal rings are activated by an activating agent. When the piston moves within the cylinder, the seal ring activates at one outlet port, and allows fluid to flow out of another outlet port.

These and additional features provided by the embodiments described herein will be more fully understood in view of the following detailed description, in conjunction with the drawings.

BRIEF DESCRIPTION OF THE SEVERAL VIEWS OF THE DRAWINGS

The following detailed description of the preferred embodiments of the present disclosure can be best understood when read in conjunction with the following drawings, where like structure is indicated with like reference numerals and in which.

DETAILED DESCRIPTION OF THE PREFERRED EMBODIMENTS

Figure 1:
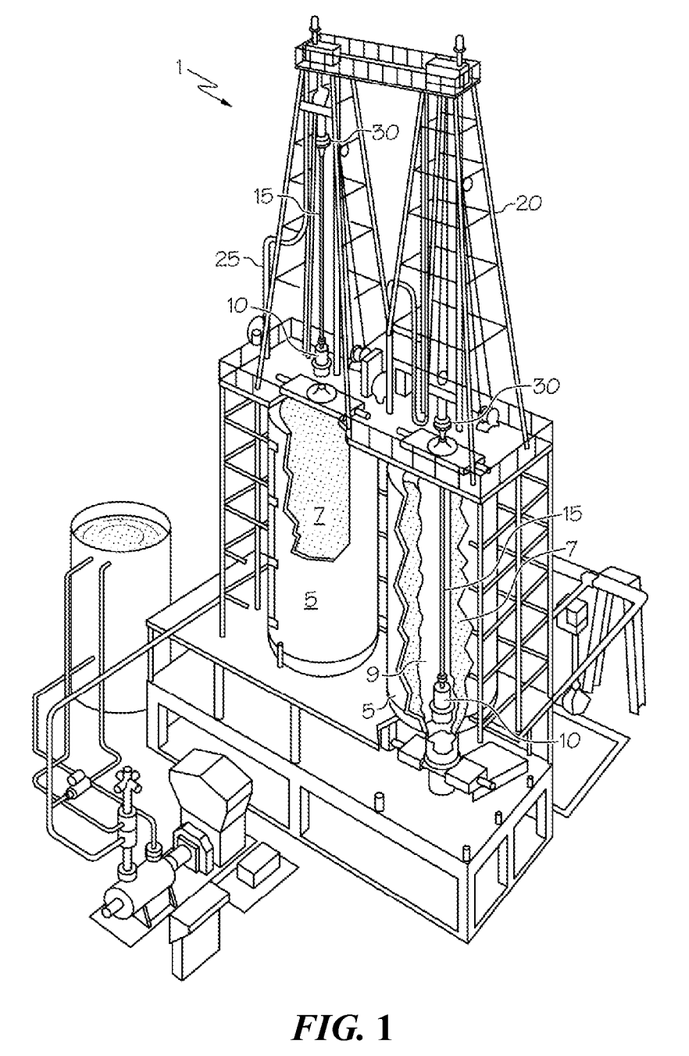
FIG. 1 is a view of a decoking system usable with the decoking control valve discussed herein.

Referring first to FIG. 1, a decoking system 1 includes a pair of coke drums 5, a cutting and boring (decoking) tool 10, a drill stem 15, a pair of towers 20, a flexible water supply hose 25 and a rotary joint 30. The partial cutaway of the left coke drum 5 show it is full of coke 7 to be removed, while the partial cutaway of the right coke drum 5 shows the decoking tool 10 being lowered through the coke 7 during boring of a pilot hole 9. The water from the tank is pressurized by the jet pump (not shown) and supplied to the decoking tool 10 via the decoking control valve 100 (FIG. 4), piping, flexible water supply hose 25, rotary joint 30, and drill stem 15. The decoking tool 10 is mounted at the lower end of the drill stem 15 such that both can move translationally (specifically, vertically) along the length of the coke drum 5. The upper end of drill stem 15 is coupled to the rotary joint 30 which provides rotational motion to the drill stem 15 and the decoking tool 10.

Figure 2:
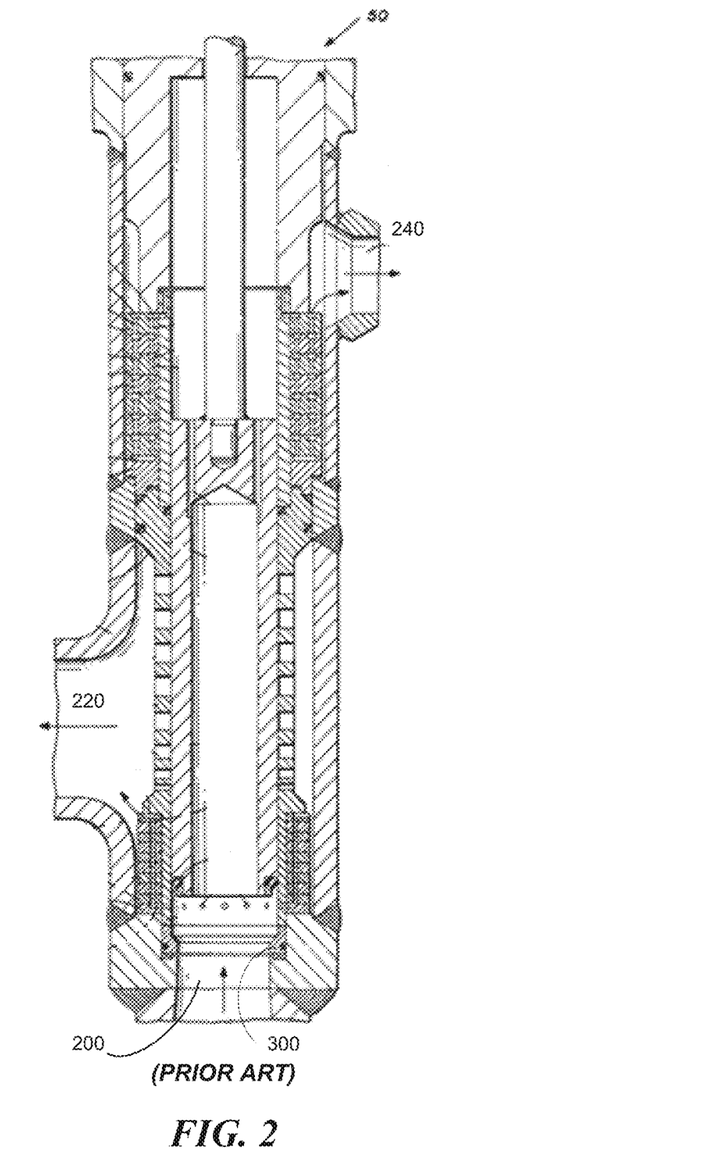
FIG. 2 is a partial, cross-sectional view of a decoking control valve of the prior art in a first operating position.
Figure 3:
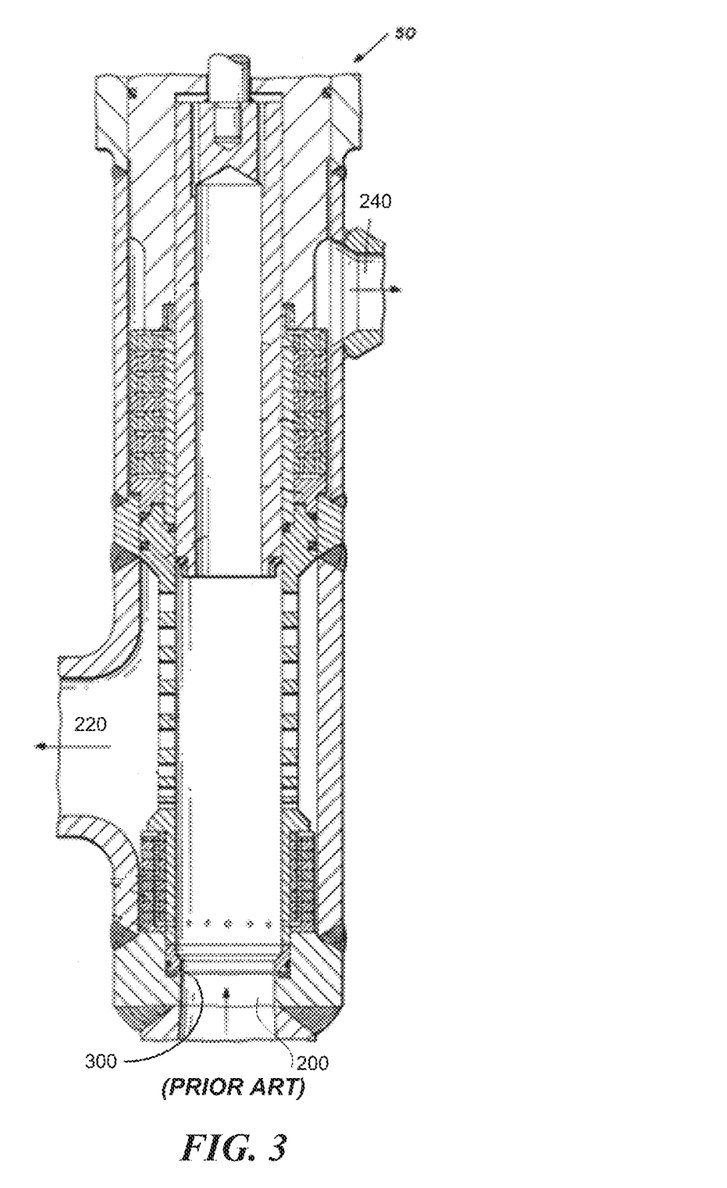
FIG. 3 is a partial, cross-sectional view of a decoking control valve of the prior art in a third operating position.

Referring now to FIG. 2 and FIG. 3, a cross-sectional view of a decoking control valve 50 of the prior art is shown in two respective operating positions. FIG. 2 shows the first operating position, in which the inlet fluid is directed to the second outlet port 240 while being sealed from the first outlet port 220 via means of a valve seat 300. FIG. 3 shows the third operating position, in which the inlet fluid is directed to the first outlet port 220 while being sealed from the second outlet port 240 via means of another valve seat 300. Using this design, in order to isolate an outlet port from the high pressure water at the inlet port 200, the actuator drives the piston until it bears on a conical annular seat to create a watertight seal.

Figure 4:
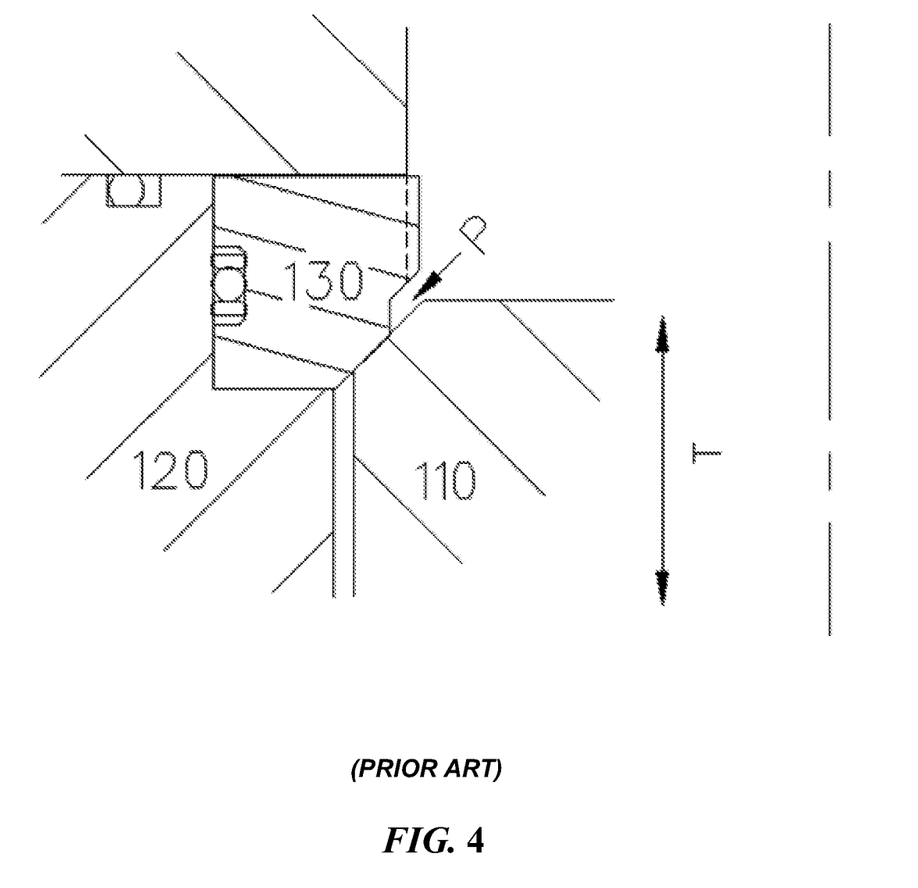
FIG. 4 is an enlarged partial, cross-sectional view of the piston and the valve seat of a decoking control valve of the prior art.

The decoking control valve 50 of the prior art has two disadvantages as described herein. As shown in FIG. 4, the piston 110, reciprocates inside the cylinder 120. The pressure P is sealed by creating necessary contact pressure between the piston 110 and the valve seat 130. Since the pressure P to be sealed is high, the contact pressure and the axial force necessary to create the contact pressure is high as well. The high axial force is to be supplied by the valve actuator (not shown). Generating a high force repetitively causes rapid wear on the moving parts inside the valve actuator, limiting the mean time between repair of the valve actuator. Also, repeated engagement of the piston 110, made of a hard material, with the valve seat 130, made of a softer material, with a high force damages the valve seat 130, eventually causing leakage. Once the valve seat 130 begins to leak, the decoking control valve 50 must be removed to be repaired. Thus, the damage to the valve seat 130 results in lower mean time between repair of the decoking control valve 50.

Figure 5:
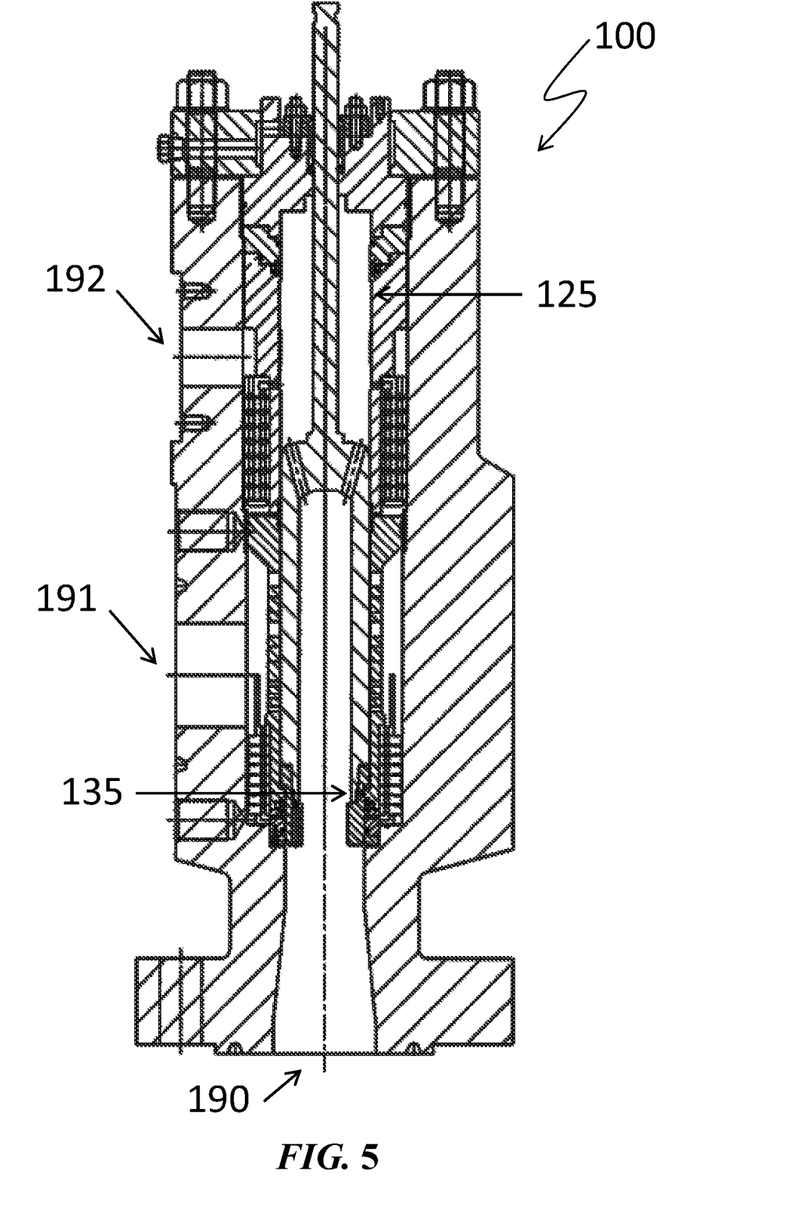
FIG. 5 is a cross-sectional view of a decoking control valve constructed according to an aspect of the present disclosure in a first operating position.
Figure 6:
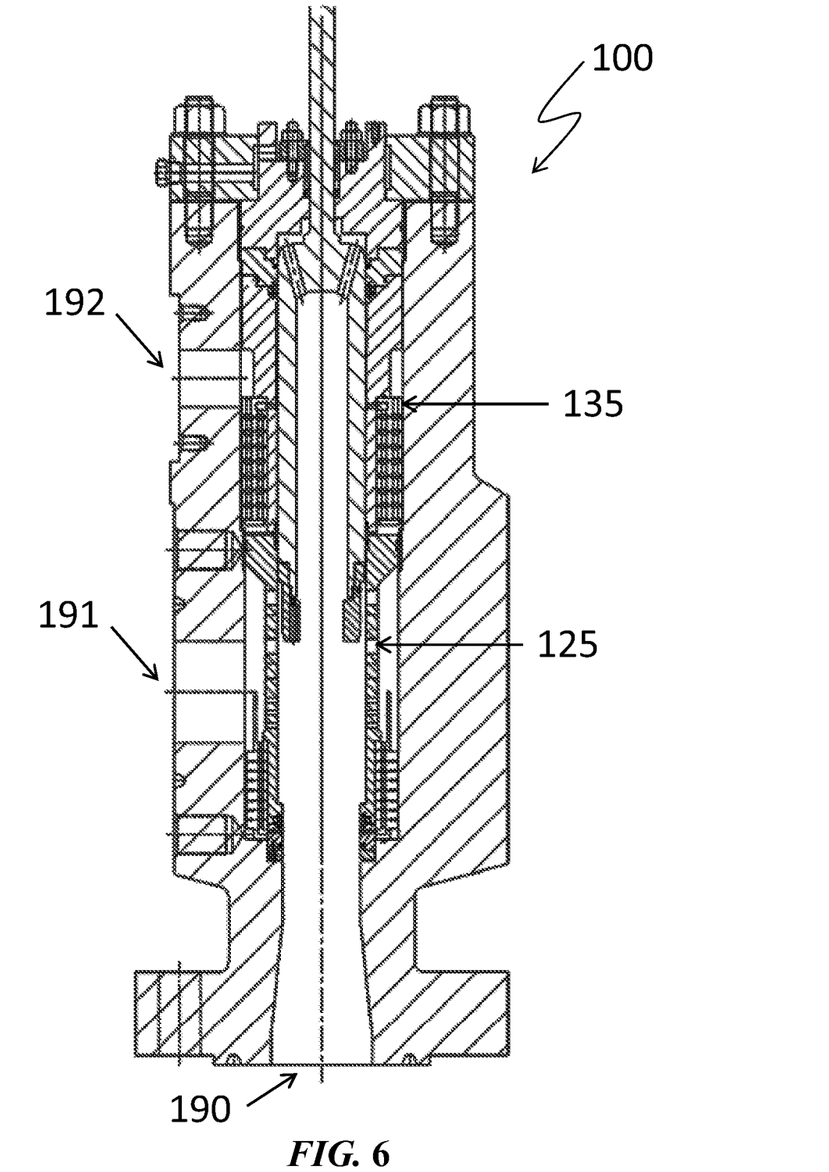
FIG. 6 is a cross-sectional view of a decoking control valve constructed according to an aspect of the present disclosure in a third operating position.

Referring now to FIG. 5 and FIG. 6, two operating positions of the decoking control valve 100 of the present disclosure are shown. It is contemplated that the decoking control valve 100 will have at least three operating positions. FIG. 5 displays the decoking control valve 100 in the first operating position wherein the first outlet port 191 is blocked, the piston 110 being in place over the respective hydraulic rod seal 135. When in this position, the decoking fluid may flow in from the inlet port 190 and out of the second outlet port 192 and will not flow out of the first outlet port 191. FIG. 6 displays the decoking control valve 100 in the third operating position where second outlet port 192 is blocked, and the piston 110 is in place over the respective hydraulic rod seal 135. When in this position, the decoking fluid may flow in from the inlet port 190 and out of the first outlet port 191 and will not flow out of the second outlet port 192.

Figure 7:
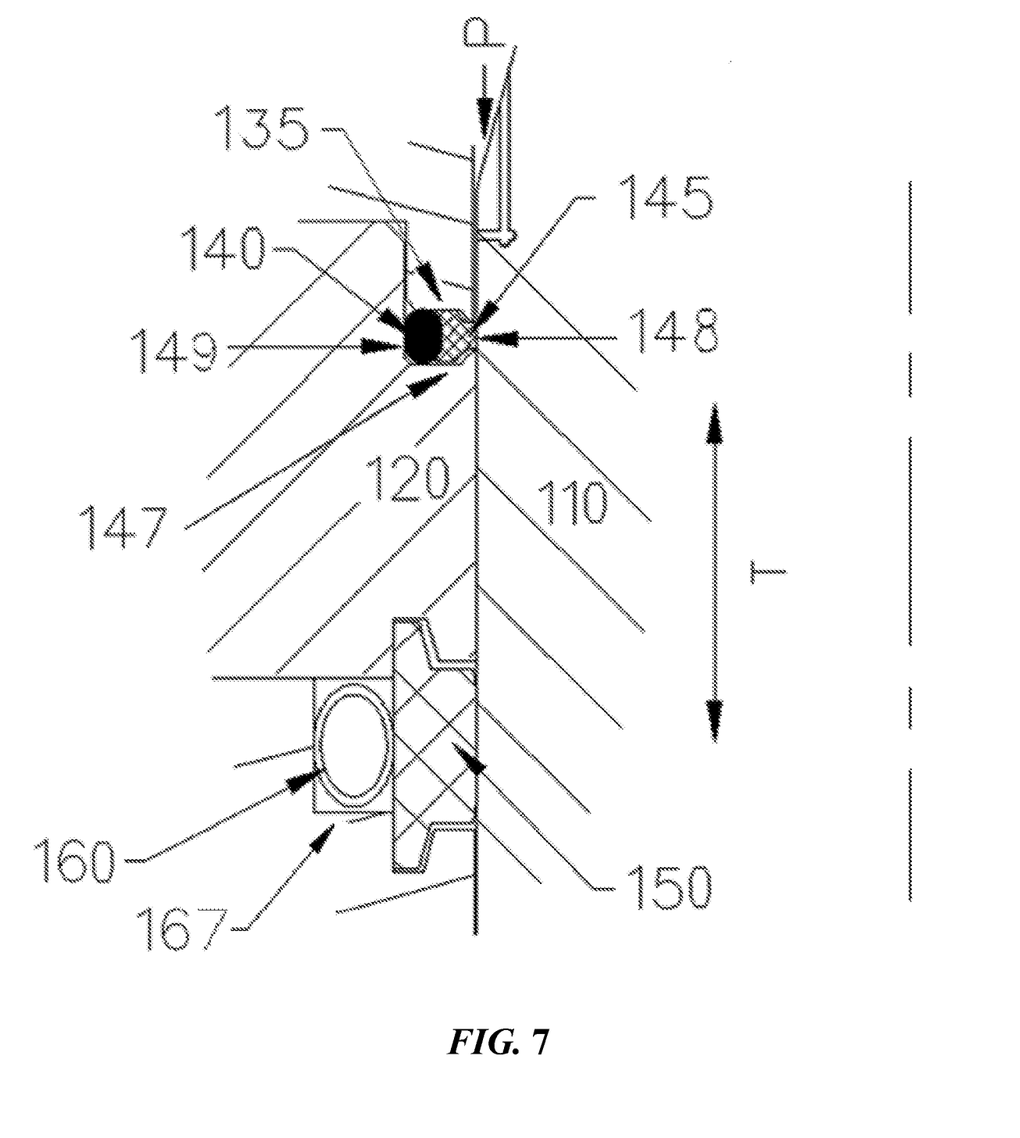
FIG. 7 is an enlarged partial, cross-sectional view of the seal ring and guide ring of the present disclosure with piston in a first position relative to the seal ring and guide ring.

The decoking control valve 100 of the present disclosure is capable of overcoming the shortcomings of the prior art decoking control valve 50 by replacing the valve seat 130 with an alternate sealing system as described herein. FIG. 7 shows an enlarged partial cross section of the decoking control valve 100 of the present disclosure. To seal the pressure P between the piston 110 and the cylinder 120 as the piston 110 moves in the direction of travel T, a hydraulic rod seal 135 is used in place of a valve seat 130 of the prior art. The hydraulic rod seal 135 is housed in a groove 147 in the cylinder 120, and is composed of a seal ring 145 that may be energized by an activator, which may include an O-ring 140 or any other element that may be suitable for energizing the seal ring 145. Once the decoking control valve 100 is in operation, the seal ring 145 may also be energized by the pressure P acting on the activator. The pressure P is sealed at the first radial interface 148 between the piston 110 and the seal ring 145, and also at the second radial interface 149 between the cylinder 120 and the activator. The contact pressure necessary for sealing is generated by the geometry of the seal ring 145. The radial thickness of the seal ring 145 in comparison to the depth of the groove 147 is such that engagement of the piston 110 with the seal ring 145 squeezes the seal ring 145 in the radial direction between the piston 110 and the cylinder 120 and develops the contact pressure. The valve actuator may supply force only to engage the hydraulic rod seal 135 and to overcome the seal friction. The material for the seal ring 145 is chosen such that it has a coefficient of friction low enough to reduce the force required to overcome the seal friction. As a result, the axial force requirement from the valve actuator in the present disclosure is significantly lower than in the prior art, which will substantially lower the wear rate of the moving components inside the valve actuator and increase the mean time between repair.

Various improvements are contemplated to prolong the life of the hydraulic rod seal 135 in order to achieve longer mean time between repair of the decoking control valve 100. The seal ring 145 is made from a wear resistant material to increase its wear life. Additionally, the radial gap (not shown) between the piston 110 and the cylinder 120 is controlled to avoid extrusion of the seal ring 145 under pressure P. A guide ring 150 in an inset 167 of the cylinder 120 energized by a coil spring 160 protects the hydraulic rod seal 135 by taking up uneven loading exerted by the piston 110 due to misalignment of the piston 110 in the cylinder bore 125 or any other reason for the misalignment. The guide ring 150 is installed on the non-pressure side of the hydraulic rod seal 135, and centers the piston 110 in the cylinder bore 125 before it engages with the hydraulic rod seal 135. The guide ring 150 used herein is substantially similar to the one disclosed in U.S. Pat. No. 4,906,109, which is incorporated herein by reference.

The decoking control valve 100 of the present disclosure uses two sets of hydraulic rod seals 135 and guide rings 150 in place of two valve seats 130 of the decoking control valve 100 disclosed in the prior art. One set of hydraulic rod seals 135 and guide rings 150 works in cooperation with the first outlet port 191 and another set of hydraulic rod seals 135 and guide rings 150 works in cooperation with the second outlet port 192. The distance by which the two sets are separated is such that the piston 110 can only be engaged with a maximum of one of the sets at a time. Therefore, for a given set of hydraulic rod seals 135 and guide rings 150 the piston 110 is not always engaged to each. To prevent the blow-out of the hydraulic rod seals 135 and the guide rings 150 from the groove 147 and inset 157, respectively, when the piston 110 is not engaged, the grooves 147 and insets 157 positively retain the hydraulic rod seals 135 and the guide rings 150. To make assembly possible, the grooves 147 and insets 157 are split radially. The hydraulic rod seals 135 described herein may be composed of any suitable material.

Figure 8:
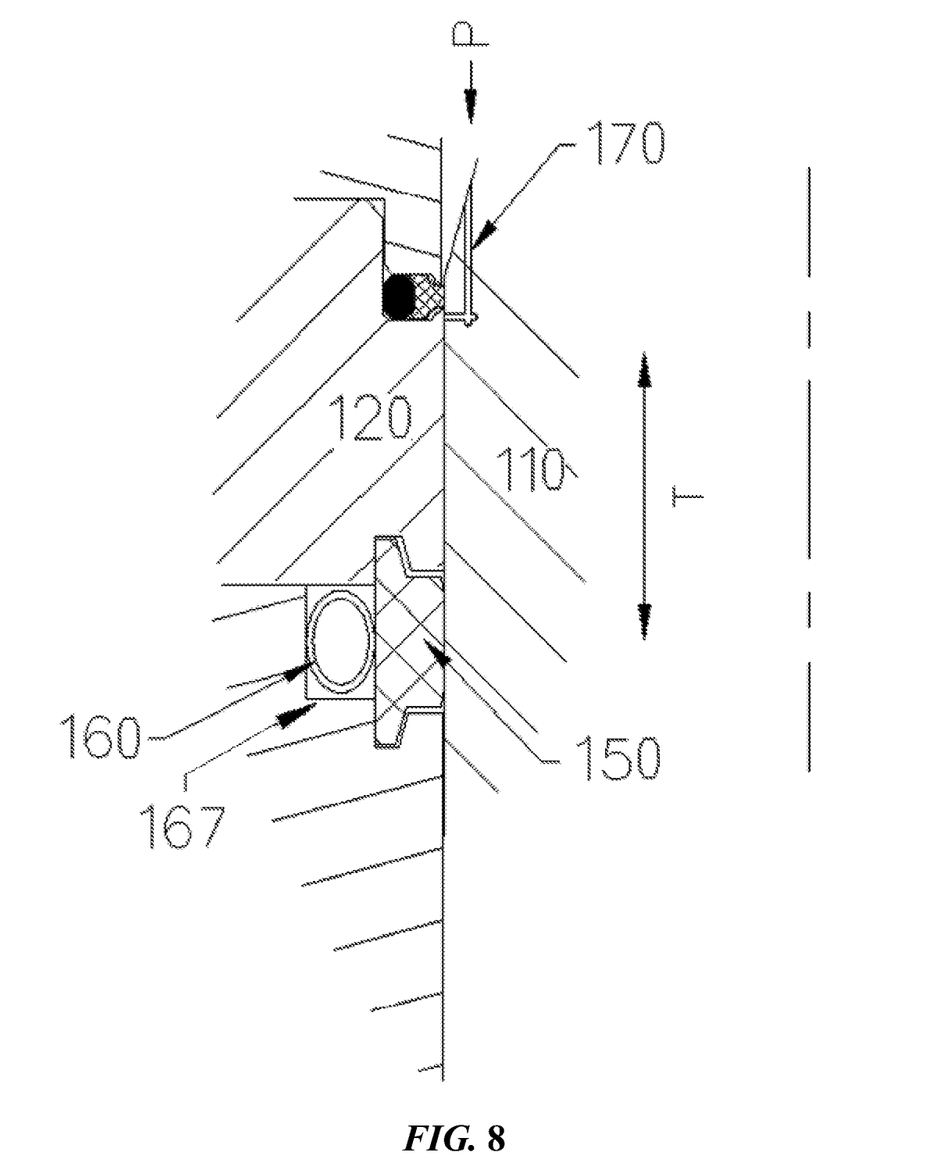
FIG. 8 is an enlarged partial, cross-sectional view of the seal ring and guide ring of the present disclosure with piston in a second position relative to the seal ring and guide ring.

When the piston 110 disengages from the seal ring 145, the high differential pressure across the seal ring 145 may push the seal ring 145 out of its groove 147 despite of positive retention. To avoid this, the pressure may be equalized across the seal ring 145 just before retracting the piston 110 completely from the seal ring 145. Therefore, the seal ring 145 is in a pressure equilibrium when the piston 110 is retracted, eliminating any unbalanced forces acting on it. FIG. 8 shows the same cross section as FIG. 7, but with the piston 110 starting to withdraw from the seal ring 145. In this position of the piston 110, the drilled port 170 of the piston 110 equalizes the pressure P across the seal ring 145. Note that in FIG. 7, the drilled ports 170 are entirely on one side of the seal ring 145, therefore the seal ring 145 is sealing the pressure P, whereas in FIG. 8, the two ends of the drilled ports 170 are on either side of the seal ring 145, thereby eliminating the pressure differential. The diameter of the drilled port 170 should be small in comparison to the width of the seal ring 145. There can be multiple such drilled ports 170 around the circumference of the piston 110.

Figure 9:
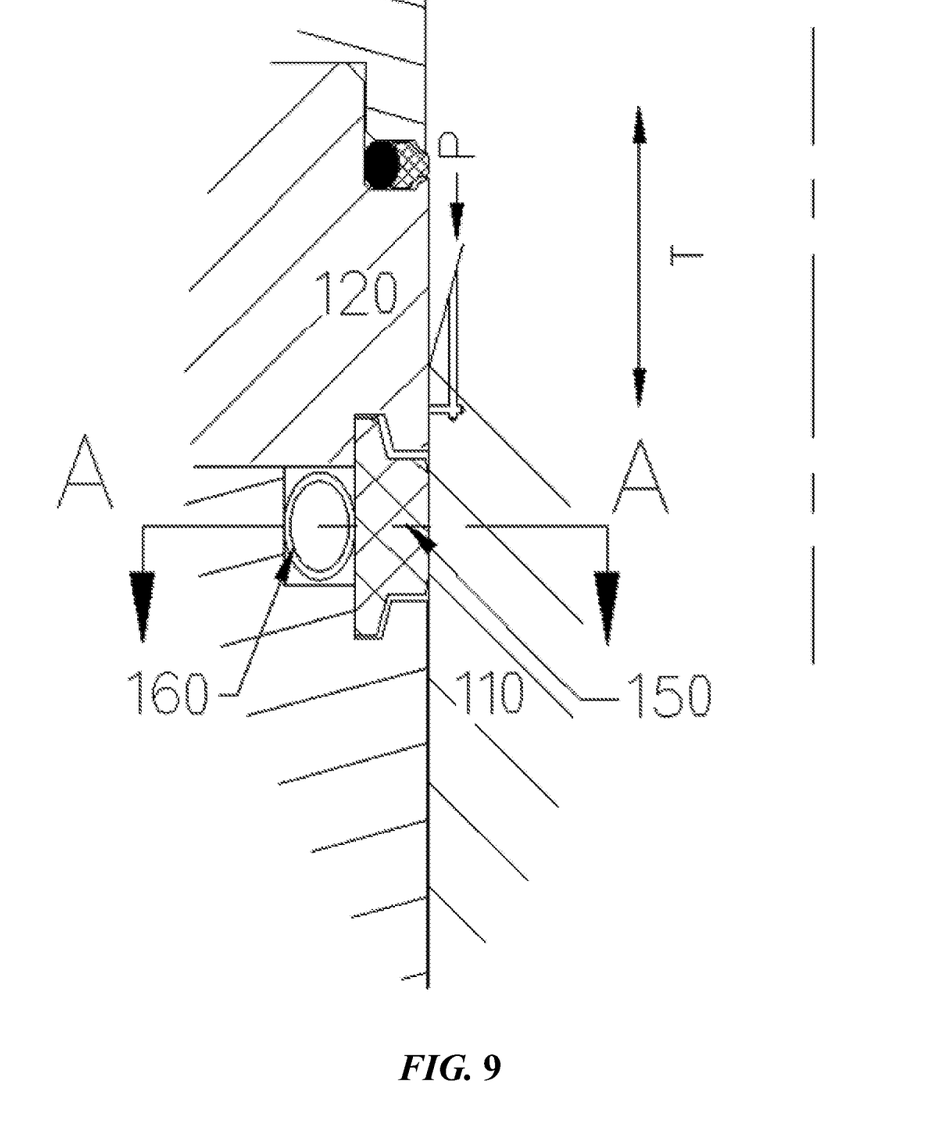
FIG. 9 is an enlarged partial, cross-sectional view of the seal ring and guide ring of the present disclosure with piston in a third position relative to the seal ring and guide ring.
Figure 10:
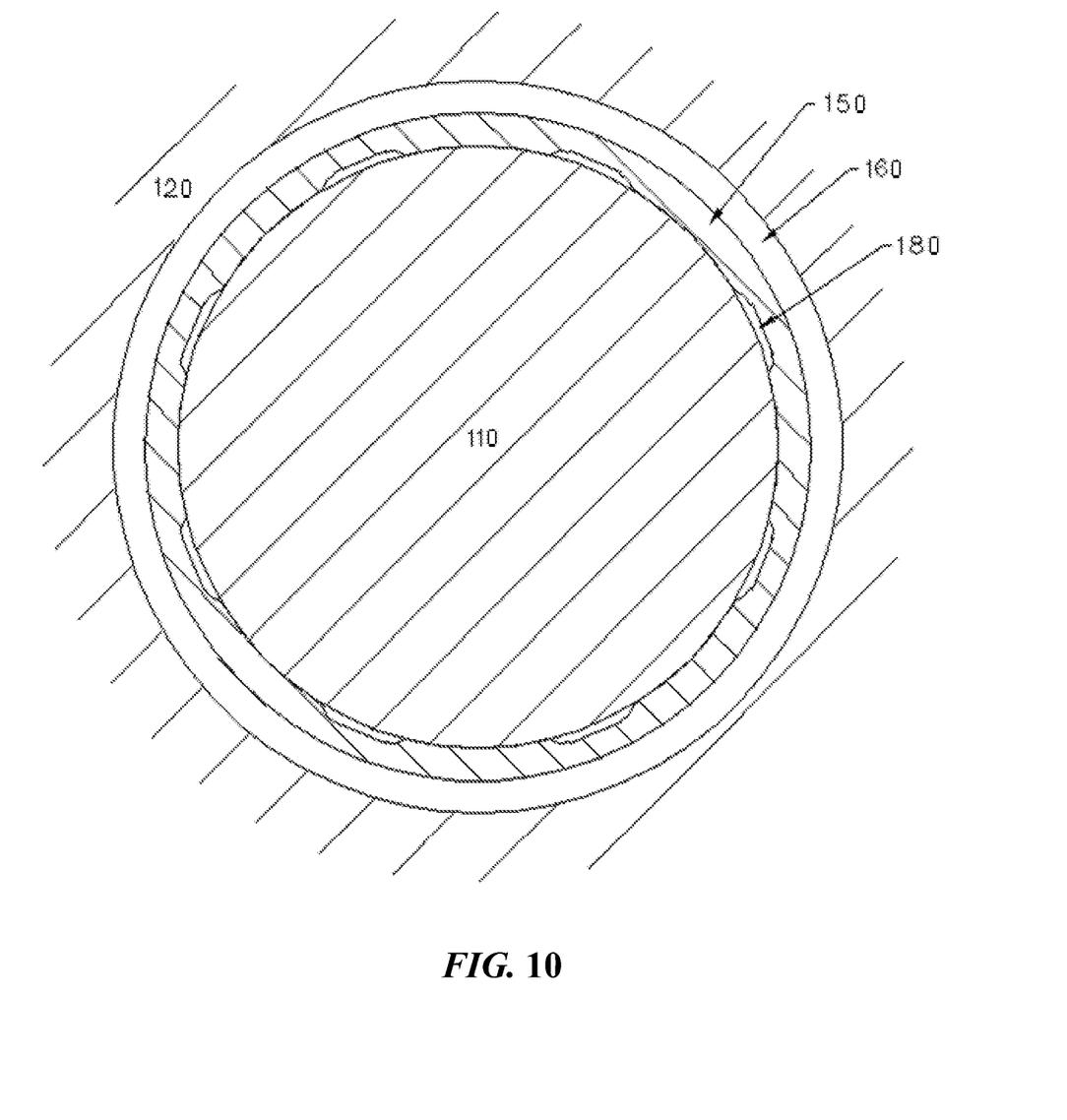
FIG. 10 is a sectional view according to Section A-A of FIG. 9.

Now referring to FIG. 9 and FIG. 10. FIG. 9 shows the same cross section as FIG. 7, but with the piston 110 completely retracted from the seal ring 145. In this position of the piston 110, the guide ring 150 is subjected to the entire pressure differential. The guide ring 150, however, is not meant to withstand any pressure differential. Therefore, to eliminate the differential pressure across the guide ring 150, axial grooves 180 are added on the inside diameter of the guide ring 150. FIG. 10 shows Section A-A of FIG. 9. The axial grooves 180 allow the water to flow through, eliminating any pressure differential. Any other method or modification to the guide ring 150 to equalize pressure, e.g. through-drilled holes, should be considered to be within the scope of the present disclosure. Additionally, the use of springs to allow water to flow through, such as those shown in FIG. 4 of U.S. Pat. No. 4,906,109, is contemplated.

Having described the various aspects of the present disclosure in detail and by reference to preferred embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects.

It is also noted that recitations herein of "at least one" component, element, etc., should not be used to create an inference that the alternative use of the articles "a" or "an" should be limited to a single component, element, etc.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A decoking control valve comprising a fluid inlet, a first outlet port, a second outlet port, a hydraulic rod seal, a guide ring, a cylinder and a piston disposed within the cylinder, the piston arranged to move along a direction of travel within the cylinder to allow selective fluid communication between the fluid inlet and the first outlet port and the second outlet port; wherein:
   each of the hydraulic rod seal and guide ring are housed within a respective groove formed within the cylinder;
   the hydraulic rod seal comprises a seal ring which engages the piston such that the seal ring is energized by a pressure created by the inlet fluid acting on an activator such that the pressure is equalized across the seal ring immediately before the piston is retracted from the seal ring, the seal ring being energized at one of the first and second outlet ports at a time; and
   the guide ring is axially separated relative to the hydraulic rod seal by a distance such that the piston can only be engaged with one or the other of the hydraulic rod seal and guide ring at a time as the piston moves along the direction of travel within the cylinder.

2. The decoking control valve of claim 1, further comprising a first operating position in which inlet fluid is directed to the second outlet port while being sealed from the first outlet port with the piston being in place over the first outlet port.

3. The decoking control valve of claim 1, further comprising a third operating position in which inlet fluid is directed to the first outlet port while being sealed from the second outlet port with the piston being in place over the second outlet port.

4. The decoking control valve of claim 1, wherein the activator is an O-ring.

5. The decoking control valve of claim 1, wherein the pressure is sealed at a first radial interface between the piston and the seal ring and is sealed at a second radial interface between the cylinder and the activator.

6. The decoking control valve of claim 1, wherein the seal ring geometry generates the pressure necessary for sealing.

7. The decoking control valve of claim 1, wherein the radial thickness of the seal ring in comparison to the depth of the groove is such that the engagement of the piston with the seal ring squeezes the seal ring in the radial direction between the piston and the cylinder in order to develop the pressure.

8. The decoking control valve of claim 1, wherein the guide ring is energized by a coil spring that protects each hydraulic rod seal by taking up uneven loading exerted by the piston.

9. The decoking control valve of claim 1, wherein the hydraulic rod seal is fluidly disposed between a source of pressure and the guide ring.

10. The decoking control valve of claim 9, wherein the groove and an inset positively retain the hydraulic rod seal and guide ring when not engaged with the piston.

11. The decoking control valve of claim 1, wherein the guide ring centers the piston in the cylinder bore before the piston engages the hydraulic rod seal.

12. The decoking control valve of claim 1, wherein the pressure is equalized across the ring seal by a drilled port in the piston.

13. The decoking control valve of claim 12, wherein the diameter of the drilled port is less than the width of the seal ring.

14. The decoking control valve of claim 1, further comprising a modification to the guide ring to equalize pressure across the guide ring prior to the retraction of the piston.

15. The decoking control valve of claim 14, wherein the modification is one or more axial grooves added to the inside diameter of the guide ring.

* * * * *